(12) United States Patent
Suzuki (10) Patent No.: US 6,628,897 B2
(45) Date of Patent: Sep. 30, 2003

(54) CAMERA SYSTEM

(75) Inventor: Kiyosuke Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/173,849

(22) Filed: Jun. 18, 2002

(65) Prior Publication Data

US 2003/0007793 A1 Jan. 9, 2003

(30) Foreign Application Priority Data

Jun. 20, 2001 (JP) ....................................... P2001-186967
Jun. 20, 2001 (JP) ....................................... P2001-186968

(51) Int. Cl.$^7$ ............................................. G03B 37/02
(52) U.S. Cl. ........................... 396/20; 396/21; 396/427; 348/36
(58) Field of Search ........................... 396/20, 21, 357, 396/427; 348/36, 38, 47, 48; 352/69, 70; 359/403

(56) References Cited

U.S. PATENT DOCUMENTS

| | | | |
|---|---|---|---|
| 5,793,527 A | * 8/1998 | Nalwa | 359/403 |
| 6,111,702 A | * 8/2000 | Nalwa | 359/725 |
| 6,115,176 A | * 9/2000 | Nalwa | 359/403 |
| 6,128,143 A | * 10/2000 | Nalwa | 359/725 |
| 6,141,145 A | * 10/2000 | Nalwa | 359/403 |
| 6,304,285 B1 | * 10/2001 | Geng | 348/36 |
| 6,386,719 B1 | * 5/2002 | Lee | 359/879 |

\* cited by examiner

*Primary Examiner*—Russell Adams
*Assistant Examiner*—Michelle Nguyen
(74) *Attorney, Agent, or Firm*—Bell, Boyd & Lloyd, LLC (57) ABSTRACT

A camera system is provided for acquiring an image of a scene with a wide angle such as an omni-directional scene with a high resolution and for acquiring an image of a dynamic object. The camera system includes a reflecting mirror, a first imaging unit, and a second imaging unit. The reflecting mirror has a mirror surface disposed around a center axis and spread on one side of the center axis to form an opening portion. The first imaging unit is provided within a plane composed of an outer surface of the reflecting mirror and a plane extending from the outer surface of the reflecting mirror on the opening portion side. The second imaging unit is disposed opposite to the mirror surface of the reflecting mirror, and includes a number of cameras disposed on the same circumference centered at the center axis of the reflecting mirror in such a manner as to be spaced from each other at equal intervals. Another camera system is provided which includes a first imaging unit having at its leading end a fish-eye lens and a second imaging unit having at its leading end a fish-eye lens. The optical axes of both the fish-eye lenses are offset from each other in parallel and imaging directions thereof are reversed to each other.

4 Claims, 7 Drawing Sheets

CAMERA SYSTEM

BACKGROUND OF THE INVENTION

The present invention relates to a camera system for acquiring images of scenes with wide angles; for example, omni-directional scenes.

Various camera systems have been proposed to acquire images of scenes with wide angles; for example, hemi-spherical or omni-directional scenes.

Typical known omni-directional imaging methods have been configured to acquire images of omni-directional scenes by manners of:

(1) arranging a number of cameras radially from a virtual spherical plane, and acquiring images of a scene by the cameras and then synthesizing the acquired images;

(2) rotating a camera around a center axis, and synthesizing images acquired by the camera;

(3) disposing a reflecting mirror composed of a convex mirror having a hyperbolic plane and locating a camera at a second focal point of the hyperbolic plane of the reflecting mirror, and acquiring an image formed on the reflecting mirror by the camera;

(4) disposing a reflecting mirror composed of plane mirrors arranged to form planes of a regular polygonal pyramid and locating cameras at positions opposed to those of the planes of the reflecting mirror, and acquiring images formed on the planes of the reflecting mirror by the cameras and then synthesizing the acquired images.

The above-described omni-directional imaging methods, however, have the following problems:

According to the method (1) characterized by arranging the number of cameras radially from the center of a virtual spherical plane, since the camera system becomes large to occupy an installed location thereof, an imaging position of the camera system is positioned apart from the center of the virtual spherical plane.

As a result, since imaging positions of respective cameras are positioned apart from each other, a parallax occurs among the images acquired by the cameras, wherein there arises a problem that a complicated operation is required to be performed for synthesizing the images acquired by the cameras.

According to the method (2) characterized by rotating the camera, since it takes a certain time to acquire an image of a scene by the rotating camera, it is difficult to acquire an image of a dynamic object.

According to the method (3) characterized by locating the camera at the second focal point of the reflecting mirror having the hyperbolic plane, the camera system is able to acquire an image of a hemispherical or omni-directional scene. However, since only one camera can be disposed at the second focal point of the reflecting mirror, there is a limitation in terms of enhancing a resolution. Such a method, therefore, fails to acquire an image of a hemispherical scene with a high resolution.

According to the method (4) characterized by arranging the number of cameras at positions opposed to those of the plane mirrors forming the regular polygonal pyramid shaped reflecting mirror and acquiring an image formed on the reflecting mirror by the cameras, since light rays are reflected from the plane mirrors, an imaging field of view of the camera system becomes 90° or less, with a result that it is insufficient to acquire an image of a hemispherical scene.

Figure 1:
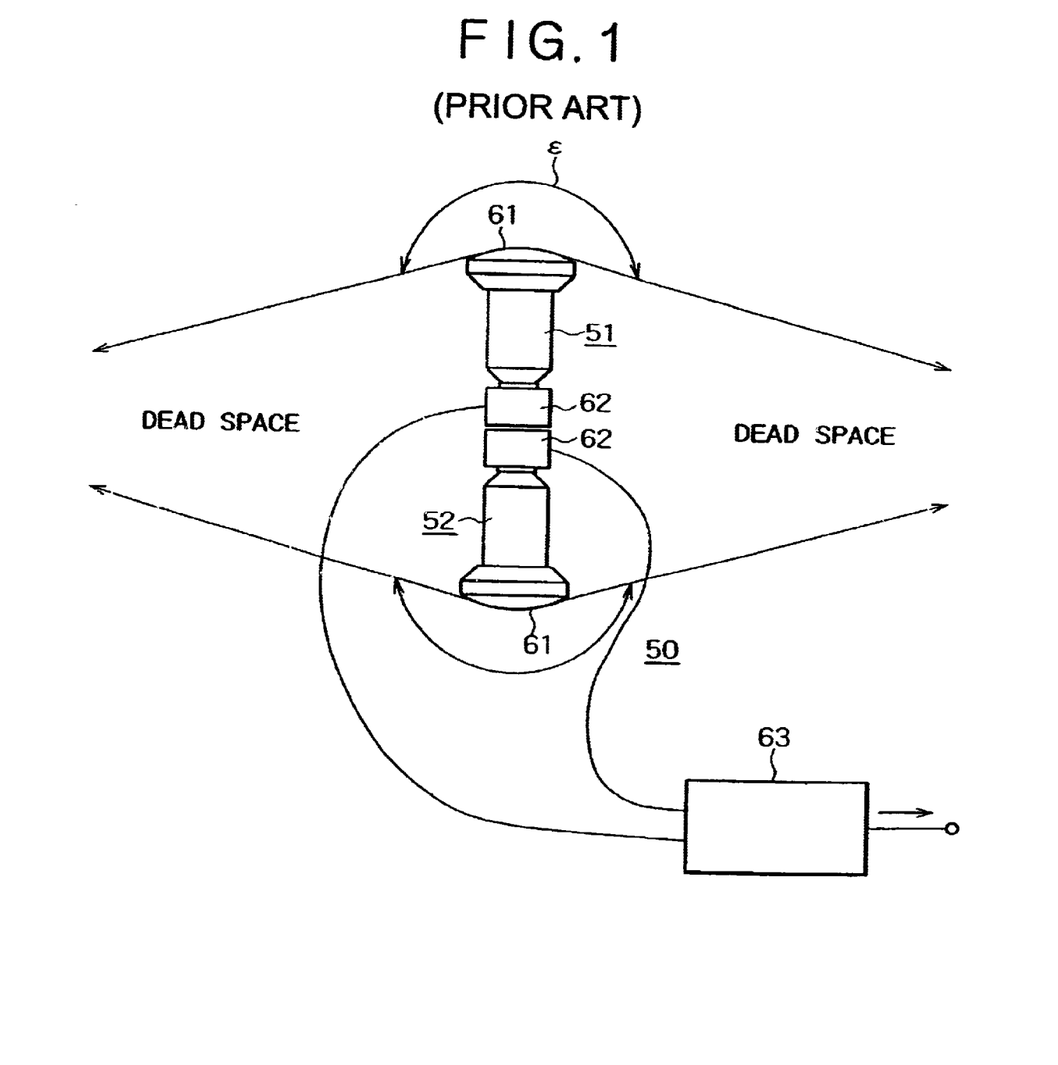
FIG. 1 is a schematic view showing a configuration of a related art camera system for acquiring an image of a hemispherical or omni-directional scene by using fish-eye lenses.

Another type of related art camera system of acquiring an image of a hemispherical or omni-direction scene by using fish-eye lenses will be described with reference to FIG. 1. FIG. 1 is a schematic view showing a configuration of the related art camera system using the two fish-eye lenses.

Referring to FIG. 1, there is shown a camera system 50 including a first imaging unit or camera unit 51 having at its leading end a fish-eye lens 61 having an imaging field of view ϵ and a second imaging unit or camera unit 52 having at its leading end a fish-eye lens 61.

An image acquired by each of the first and second imaging units 51 and 52 through the fish-eye lens 61 having an imaging field of view ϵ is converted into an image signal in a camera portion 62 provided in each of the first and second imaging units 51 and 52, and the image signal is supplied to a signal synthesizing unit 63 provided at a stage subsequent to the camera system. The image signals supplied from the first and second imaging units 51 and 52 are synthesized by the signal synthesizing unit 63.

In this camera system, the first and second imaging units 51 and 52 are arranged such that imaging directions of the two fish-eye lenses 61 are reversed to each other and the optical axes thereof are aligned in line.

The related art camera system configured as described above, however, has a problem. Since the first and second imaging units 51 and 52 are arranged such that the imaging directions of the two fish-eye lenses 61 are reversed to each other and the optical axes thereof are aligned in line, a distance between the two fish-eye lenses 61 becomes longer, with a result that a dead space impossible to be imaged becomes wider, and a parallax between the images becomes large due to a difference between the positions of the fish-eye lenses 61.

With respect to the above-described related art camera system, there has been known a method in which image signals acquired by the two imaging units or camera units 51 and 52 each having the fish-eye lens 61 are separately recorded by two recorders.

Such a method, however, has a problem that since both the recorders must be operated in synchronization with each other, the configuration of the camera system becomes complicated.

SUMMARY OF THE INVENTION

An object of the present invention is to solve the above-described problems and to provide a camera system capable of acquiring an image of a scene with a wide angle, such as an omni-directional scene, as well as acquiring an image of a dynamic object.

To achieve the above object, according to a first embodiment of the present invention, there is provided a camera system including a reflecting mirror, a first imaging unit, and a second imaging unit. The reflecting mirror has a mirror surface disposed around a center axis, wherein the mirror surface is spread on one side of the center axis to form an opening portion. The first imaging unit is provided within a plane composed of an outer surface of the reflecting mirror and a plane extending from the outer surface of the reflecting mirror on the opening portion side. The second imaging unit is disposed opposite to the mirror surface of the reflecting mirror, and includes a number of cameras disposed on the same circumference centered at the center axis of the reflecting mirror in such a manner as to be spaced from each other at equal intervals.

With this configuration, an image of a scene on the opening portion side can be acquired, from the interior of the reflecting mirror, by the first imaging unit, and an image of a scene, formed on the mirror surface of the reflecting mirror, can be acquired by the cameras of the second imaging unit opposed to the mirror surface of the reflecting mirror. In particular, an image of a scene with a wide angle, formed on the reflecting mirror, can be acquired by the second imaging unit.

Since the cameras of the second imaging unit are disposed on the same circumference centered at the center axis of the reflecting mirror in such a manner as to be spaced from each other at equal intervals, the cameras are able to acquire parts of an image formed on the reflecting mirror without occurrence of any deviation due to a parallax among the parts of the image.

To achieve the above object, according to a second embodiment of the present invention, there is provided a camera system capable of acquiring an image of a scene with a wide angle with a simple structure. The camera system includes a first imaging unit having at its leading end a fish-eye lens, and a second imaging unit having at its leading end a fish-eye lens. The first imaging unit and the second imaging unit are arranged adjacent to each other in such a manner that optical axes of the fish-eye lenses of the first and second imaging units are offset from each other in parallel, and imaging directions of the fish-eye lenses of the first and second imaging units are reversed to each other.

With this configuration, since the optical axes of the fish-eye lenses are offset from each other in parallel and the imaging directions thereof are reversed to each other, the first and second imaging units can be disposed adjacent to each other. As a result, it is possible to obtain an image of a scene with a wide angle by acquiring images of halves, spread in the reversed directions, of the scene by the two imaging units and then synthesizing the two images.

Since the optical axes of the fish-eye lenses are offset from each other in parallel and the imaging directions thereof are reversed to each other, the distance between the two fish-eye lenses disposed at both the ends of the two imaging units can be shortened.

Additional features and advantages of the present invention are described in, and will be apparent from, the following Detailed Description of the Invention and the Figures.

DETAILED DESCRIPTION OF THE INVENTION

One camera system according to the present invention includes a reflecting mirror, a first imaging unit, and a second imaging unit. The reflecting mirror has a mirror surface disposed around a center axis, wherein the mirror surface is spread on one side of the center axis to form an opening portion. The first imaging unit is provided within a plane composed of an outer surface of the reflecting mirror and a plane extending from the outer surface of the reflecting mirror on the opening portion side. The second imaging unit is disposed opposite to the mirror surface of the reflecting mirror, and includes a number of cameras disposed on the same circumference centered at the center axis of the reflecting mirror in such a manner as to be spaced from each other at equal intervals.

The first imaging unit preferably has one fish-eye lens, an imaging center of which is disposed on the center axis of the reflecting mirror.

The reflecting mirror is preferably a hyperbolic mirror or a parabolic mirror, and the second imaging unit is preferably formed by alternately arranging cameras of a near focal point type and cameras of a far focal point type.

The reflecting mirror may be composed of plane mirrors arranged to form planes of a regular polygonal pyramid shape.

The camera system preferably includes a signal synthesizer for synthesizing image signals acquired by the first imaging unit and the second imaging unit.

Hereinafter, one embodiment of the camera system according to the present invention will be described with reference to the accompanying drawings.

Figure 2:
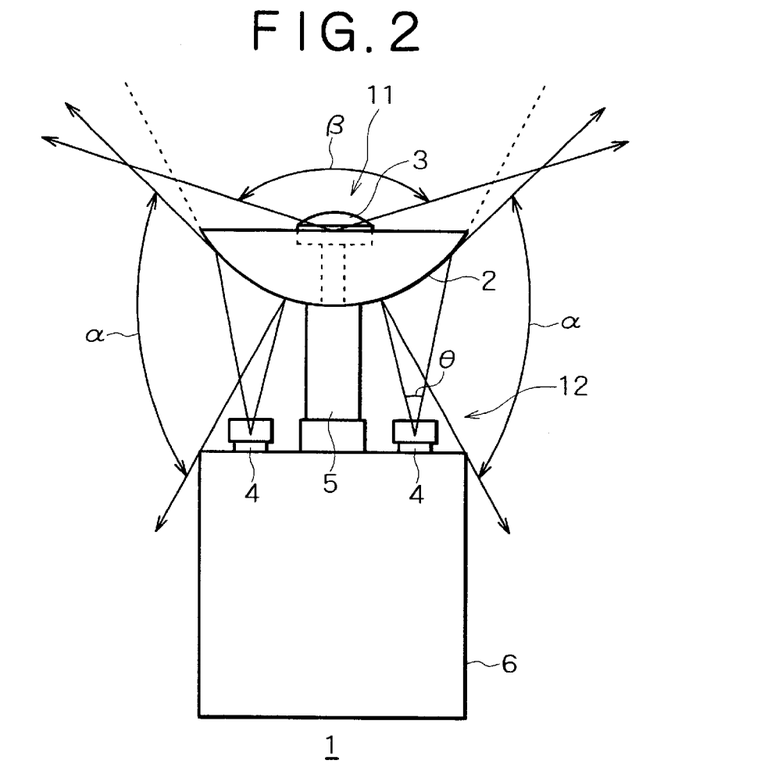
FIG. 2 is a schematic side view showing a configuration of one embodiment of a camera system of the present invention.

FIG. 2 is a schematic side view showing a configuration of the first embodiment of the camera system according to the present invention.

Referring to FIG. 2, there is shown a camera system 1 including a reflecting mirror 2 composed of a convex mirror having a parabolic plane, a first imaging unit 11, and a second imaging unit 12.

The reflecting mirror 2 is disposed such that the center axis of the parabolic plane corresponds to the vertical direction, and the parabolic plane is spread upwardly to form an opening portion. The outer surface of the reflecting mirror 2 is configured to reflect light rays therefrom.

The first imaging unit 11 is disposed within a plane composed of the outer surface of the reflecting mirror 2 and a plane extending from the outer surface of the reflecting mirror 2. The first imaging unit 11 is composed of a camera having a fish-eye (wide-angle lens) 3, and is provided at a position on the center axis of the reflecting mirror 2.

An imaging field of view β of the camera having the fish-eye lens 3 is set to be as wide as, for example, about 120°.

The second imaging unit 12 is composed of a number of cameras 4 on a base body 6.

The number of cameras 4 are, as will be described later, disposed on the same circumference on the upper surface of the base body 6 in such a manner as to be spaced from each other at equal intervals.

Each of the cameras used for the first and second imaging units 11 and 12 has, while not shown, an imaging device; for example, a solid-state imaging device such as CCD solid-state imaging device.

In FIG. 2, reference numeral 5 denotes a column for supporting the reflecting mirror 2. A signal line for transmitting image signals acquired by the fish-eye lens 3 to the base body 6 side through a columnar portion, shown by a broken line, of the first imaging unit 11 in the reflecting mirror 2 is provided in the column 5.

Figure 3:
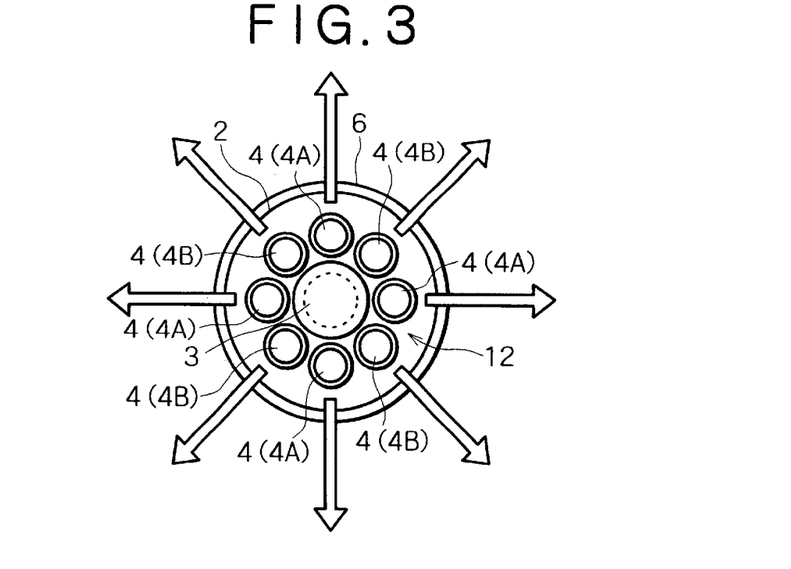
FIG. 3 is a plan view, seen in perspective from above, the camera system shown in FIG. 2.

FIG. 3 is a plan view, in perspective from above, of the camera system 1 shown in FIG. 2, illustrating a planar arrangement of the camera system 1.

The second imaging unit 12 is composed of the number (eight pieces in this embodiment) of the cameras 4 provided on the upper surface of the base body 6 in such a manner as to be spaced from each other at equal intervals on the same circumference centered at the center axis of the reflecting mirror 2.

The eight cameras 4 are oriented with their imaging directions extending along the vertical direction; that is, along the center axis direction of the reflecting mirror 2.

Each of these cameras 4 acquires an allotted portion, depicted as an imaging direction shown by an arrow in FIG. 3, of an image formed on the reflecting mirror 2.

An imaging center of the fish-eye lens 3 of the first imaging unit 11 lies on the center axis of the reflecting mirror 2.

Assuming that the reflecting mirror 2 is not provided, the cameras 4 (4A, 4B) of the second imaging unit 12 acquire the same images as those having their imaging centers disposed at a point (focal point of the parabolic plane or hyperbolic plane) on the center axis of the interior of the reflecting mirror 2. From this viewpoint, the imaging centers of the cameras 4 (4A, 4B) of the second imaging unit 12 may be regarded as being located on the center axis of the reflecting mirror 2.

Since the imaging centers of the first and second imaging units 11 and 12 lie on the center axis of the reflecting mirror 2 as described above, the first and second imaging units 11 and 12 can be made close to each other.

As a result, according to the camera system in this embodiment, a parallax between the acquired images can be made significantly small.

According to this embodiment, the eight cameras 4 of the second imaging unit 12 are composed of two kinds of cameras 4A and 4B, which are different in focal position. The cameras 4A of a near focal point type and the cameras 4B of a far focal point type are alternately arranged. To be more specific, as shown in FIG. 3, the cameras 4A of the near focal point type are arranged at positions of 0°, 90°, 180°, and 270°, and the cameras 4B of the far focal point type are arranged at positions of 45°, 135°, 225°, and 315°.

With this configuration, an image formed on a central portion and its neighborhood of the reflecting mirror 2 can be acquired by the cameras 4A of the near focal point type, and an image formed on a peripheral portion of the reflecting mirror 2 can be acquired by the cameras 4B of the far focal point type.

As described above, the imaging centers of the eight cameras 4 (4A, 4B) of the second imaging unit 12 lie on the center axis of the reflecting mirror 2. In other words, the imaging centers of the eight cameras 4 correspond to each other.

However, since the reflecting mirror 2 has the parabolic plane, the position of a virtual image corresponding to a reflection image formed on the parabolic plane of the reflecting mirror 2 differs depending on the reflection position on the reflecting mirror 2.

The distance of an optical path from an object to each camera via the reflecting mirror thus differs depending on the position of a virtual image. Therefore, the distance between the object and the camera differs depending on the reflection position on the reflecting mirror 2.

To cope with such an inconvenience, it may be considered to adopt a lens of the camera 4 having a large depth of field for preventing an image from being blurred.

When the imaging position of each camera 4 is close to the position of the reflection image, however, it is difficult to make the depth of field large. This becomes apparent from the fact that in the case of using a close-up lens, if the depth of field becomes large, the acquired image becomes dark.

In this regard, according to this embodiment, as described above, the eight cameras 4 of the second imaging unit 12 are composed of the cameras 4A and 4B of the two kinds different in focal position, wherein the cameras 4A of the near focal point type and the cameras 4B of the far focal point type are alternately arranged, with a result that a clear focused image with a sufficient brightness can be acquired.

The imaging field of view $\theta$ of each of the cameras 4 (4A, 4B) of the second imaging unit 12 is set to be as narrow as, for example, 30° or less. Preferably, the camera 4 is configured as a telecentric optical system having an imaging field of view of 0°.

The optical center of each of the cameras 4 is located at the focal point of the parabolic plane of the reflecting mirror 2. Therefore, an image synthesized from partial images acquired by the eight cameras 4 (4A, 4B) is equivalent to an image seen from the focal point of the parabolic plane of the reflecting mirror 2.

Since an imaging field of view $\alpha$ of the second imaging unit 12 equivalent to the size of a virtual image formed on the parabolic plane of the reflecting mirror 2 is as large as about 120°, a scene with a very wide angle, that is, a scene with little dead space, can be imaged by the second imaging unit 12.

It is to be noted that a convex mirror having a hyperbolic plane replaced from the parabolic plane may be used as the reflecting mirror 2. In this case, a camera system similar to the above-described camera system 1 can be achieved by using the same first and second imaging units 11 and 12 as those shown in FIG. 2 and FIG. 3, in addition to the reflecting mirror 2 having the hyperbolic plane.

Even in the camera system including the reflecting mirror 2 having the hyperbolic plane, since the positions of the imaging centers of the eight cameras 4 do not lie at the second focal point of the reflecting mirror 2 (note: in the related art system having only one camera, the imaging center lies at the second focal point), the position of a virtual image differs depending on the reflection position on the reflecting mirror 2.

Accordingly, like the camera system including the reflecting mirror 2 having the parabolic plane, the eight cameras 4 of the second imaging unit 12 are preferably composed of cameras 4A and 4B of two kinds different in focal position, wherein the cameras 4A of the near focal point type and the cameras 4B of the far focal point type are alternately arranged.

A signal synthesizing unit 8 to be described later for synthesizing the image signals acquired by the imaging units 11 and 12 is provided at a stage subsequent to the camera system 1. As a result, images each for part of a scene with a wide angle, such as an omni-directional scene, which have been acquired by the imaging units 11 and 12, are processed into a composite image of the scene with a wide angle by the signal synthesizing unit 8.

Figure 4:
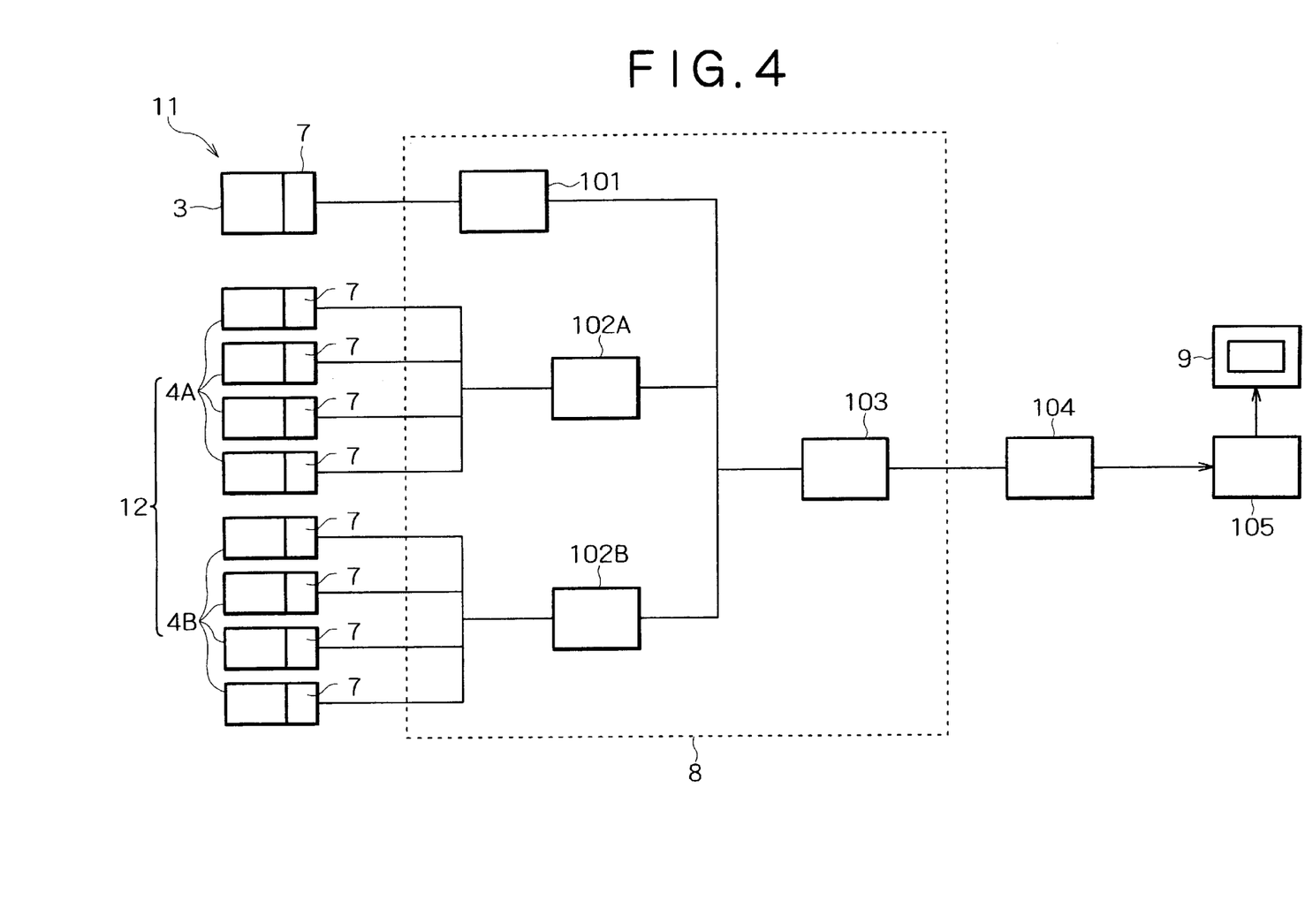
FIG. 4 is a block diagram showing one example of a configuration for synthesizing image signals acquired by the camera system shown in FIG. 2.

FIG. 4 is a block diagram showing one example of a configuration for synthesizing image signals in the camera system 1 shown in FIG. 2.

Imaging devices 7 such as CCD solid-state imaging devices are provided in the camera of the first imaging unit 11 including the fish-eye lens 3 and the eight cameras 4A and 4B of the second imaging unit 12, respectively. An image made incident on each camera can be acquired by the imaging device 7.

The camera system 1 may be configured such that synchronization signals be supplied to respective imaging devices 7. With this configuration, by adjusting triggers of the synchronization signals, images acquired at the same time can be synthesized by the signal synthesizing unit 8. As a result, even for a dynamic object, images of the dynamic object acquired at the same time by respective cameras can be synthesized into a composite image.

The signal synthesizing unit 8 will be more fully described below.

Image signals acquired by the imaging devices 7 are supplied to the signal synthesizing unit 8, denoted by a chain line in FIG. 4, at the stage subsequent to the camera system 1. The signal synthesizing unit 8 is provided, for example, in the base body 6 shown in FIG. 2 or outside the camera system 1.

As shown in FIG. 4, the signal synthesizing unit 8 includes a signal processing portion 101 for processing image signals acquired by the first imaging unit 11 via the fish-eye lens 3, a signal processing portion 102A for synthesizing image signals acquired by the four cameras 4A of the near focal point type of the second imaging unit 12, and a signal processing portion 102B for synthesizing image signals acquired by the four cameras 4B of the far focal point type of the second imaging unit 12.

The signal synthesizing unit 8 further includes a signal synthesizing portion 103 for synthesizing signals obtained by the signal processing portions 101, 102A, and 102B.

A signal recording/storing portion 104 for recording or storing the described synthesized signal is provided at a stage subsequent to the signal synthesizing unit 8. A signal displaying portion 105 for displaying signals, which have been recorded or stored in the signal recording/storing portion 104, on a monitor 9 is provided at a stage subsequent to the signal recording/storing portion 104.

With this configuration, image signals acquired by the imaging units 11 and 12 can be synthesized into a composite image signal by the signal synthesizing unit 8, and the composite image signal can be recorded or stored in the signal recording/storing portion 104. Further, the image signal, which has been recorded or stored in the signal recording/storing portion 104, can be displayed on the monitor 9 by the signal displaying portion 105, as needed.

It is to be noted that the configuration for synthesizing image signals acquired by the imaging units 11 and 12 is not limited to that shown in FIG. 4 but may be any other configuration without departing from the scope of the present invention.

The camera system 1 according to this embodiment configured as described above has the following advantages:

In the second imaging unit 12, since an image formed on the reflecting mirror 2 composed of the convex mirror having the parabolic plane (which may be replaced with a hyperbolic plane) is acquired, the imaging field of view α of the second imaging unit 12 can be made as large as, for example, about 120°.

Accordingly, even if the size of the reflecting mirror 2 is reduced, a lower half of a scene, spread downwardly with a wide angle, can be imaged by the second imaging unit 12. As a result, the camera system 1 can be miniaturized by reducing the sizes of the reflecting mirror 2 and the cameras 4 of the imaging unit 12. For example, the size of each of the imaging units 11 and 12 can be reduced to 40 mm or less.

In the first imaging unit 11, an upper half of the scene, spread upwardly with a wide angle, can be imaged by the camera having the fish-eye lens (wide-angle lens) 3. In this case, the imaging field of view β of the camera can be made as large as, for example, about 120°.

Accordingly, an image of a scene with a very wide angle can be acquired by synthesizing an image of an upper half of the scene acquired by the first imaging unit 11 and an image of a lower half of the scene acquired by the eight cameras 4 (4A, 4B) of the second imaging unit 12.

In the second imaging unit 12, since the eight cameras 4 are composed of the two camera groups 4A and 4B different in focal position (each including the four cameras allotting four imaging regions along the four specific imaging directions), an image can be acquired with a high resolution by the cameras 4A and 4B. As a result, a lower half of a scene, spread with a wide angle, can be imaged with a high resolution by the second imaging unit 12.

By supplying synchronization signals to the imaging devices 7 provided for respective cameras of the first and second imaging units 11 and 12, it is possible to acquire images of a dynamic object with a wide angle and to synthesize the images along elapsed time.

Since both the imaging centers of the first and second imaging units 11 and 12, which lie on the center axis of the reflecting mirror 2, can be made closer to each other, it is possible to significantly reduce a parallax between the images acquired by the first and second imaging units 11 and 12. As a result, it is possible to easily synthesize images acquired by respective cameras.

In addition, in the case of applying the camera system 1 according to this embodiment to a camera system having a large-sized and heavy camera portion such as a 3CCD camera, an HDTV camera, or a camera for a region other than a visible region (for example, infrared or ultraviolet region), since the first and second imaging units 11 and 12 can be miniaturized as shown in FIGS. 2 and 3, although the base body 6 portion is enlarged, the size of an imaging portion (observing portion) of the camera system can be significantly reduced.

Figure 5:
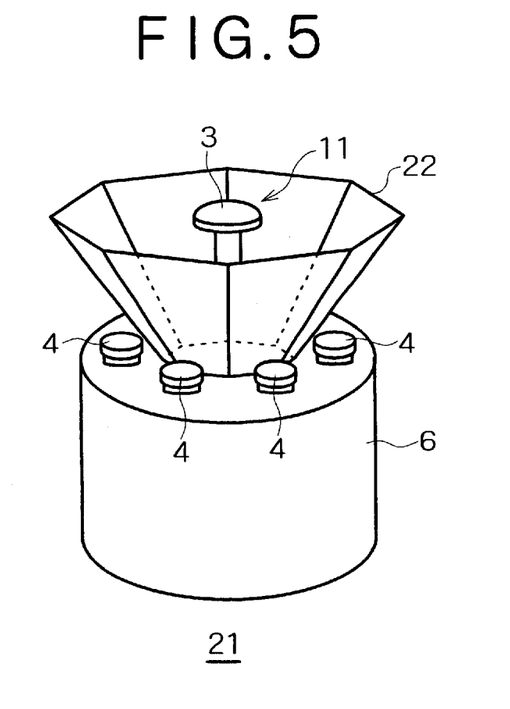
FIG. 5 is a schematic perspective view showing a configuration of another embodiment of the camera system of the present invention.
Figure 6:
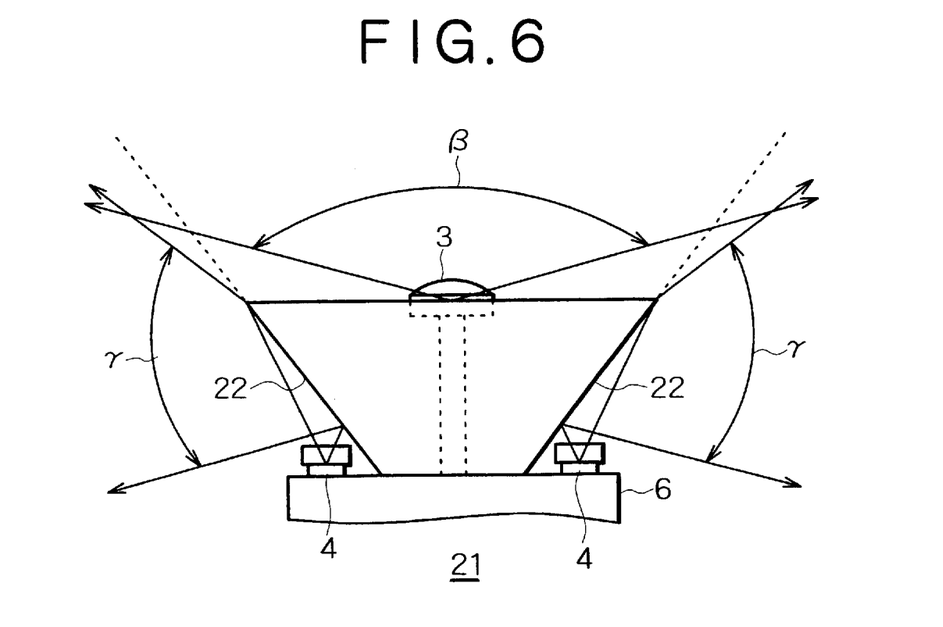
FIG. 6 is a side view of the camera system shown in FIG. 5.

Another embodiment of the camera system according to the present invention will be described below with reference to FIGS. 5 and 6. FIGS. 5 and 6 are a schematic perspective view and a schematic side view showing a configuration of the camera system according to this embodiment, respectively.

Referring to FIG. 5, there is shown a camera system 21 according to this embodiment, wherein the reflecting mirror 2 having the curved plane in the camera system 1 according to the previous embodiment is replaced with a reflecting mirror 22 composed of plane mirrors arranged to form planes of a regular polygonal pyramid.

To be more specific, the plane mirrors of eight pieces are arranged to form planes of a regular octagonal pyramid, wherein the planes of the regular octagonal pyramid are opposed to eight cameras, arranged on the same circumference like the previous embodiment, of a second imaging unit 12, to constitute the reflecting mirror 22.

Like the previous embodiment, the reflecting mirror 22 is disposed such that the mirror surface is spread outwardly to form an opening portion that is opened upwardly.

The camera system 21 also includes a first imaging unit 11. Like the previous embodiment, the first imaging unit 11 has a fish-eye lens (wide-angle lens) having an imaging center on the center axis of the reflecting mirror 22. The first imaging unit 11, therefore, is able to acquire an image of an upper half of a scene on the opening portion side; that is, on the side spread upwardly from the reflecting mirror 22.

The camera system 21 further includes a second imaging unit 12. Like the previous embodiment, the second imaging unit 12 is composed of eight cameras 4 arranged on the same circumference centered at the center axis of the reflecting mirror 22. The eight cameras 4 are arranged such that imaging directions thereof correspond to the vertical direction; that is, the center axis direction of the reflecting mirror 22.

Even in this embodiment, an imaging center of the second imaging unit 12 lies on the center axis of the reflecting mirror 22.

It is to be noted that in this embodiment, since the reflecting mirror 22 is composed of the eight plane mirrors, each of the cameras 4 is disposed so as to be opposed to the center line of the corresponding one of the plane mirrors of the reflecting mirror 22.

Since the mirror surface of the reflecting mirror 22 is composed of plane surfaces of the plane mirrors, the position of a virtual image formed on the plane surface of each of the plane mirrors is symmetric to the corresponding one of the cameras 4 with respect to the plane surface of the plane mirror.

Since the eight cameras 4 are arranged on the same circumference centered at the center axis of the reflecting mirror 22 and the imaging directions thereof correspond to (are parallel to) the center axis direction of the reflecting mirror 22, positions of partial virtual images for the eight cameras 4 lie at one point on the center axis of the reflecting mirror 22.

In addition, according to this embodiment, unlike the previous embodiment, the eight cameras 4 have the same focal position.

The reason for this is that since the positions of partial virtual images for the eight cameras 4 lie at one point and, thereby, a distance of an optical path from an object to each camera 4 via the reflecting mirror 22 is independent of the reflecting position on the mirror surface of the reflecting mirror 22, it is not required to change the focal points of the eight cameras 4 into the two kinds (near focal point and far focal point) as the previous embodiment.

The other configurations of the camera system 21 are the same as those of the camera system 1 in the previous embodiment. Therefore, the overlapped description thereof is omitted.

In this embodiment, because of use of the regular octagonal pyramid shaped reflecting mirror 22, an imaging field of view γ of the second imaging unit 12 composed of the cameras 4 is less than 90°; that is, smaller than the imaging field of view α of the second imaging unit 2 of the camera system 1 shown in FIG. 2.

The camera system 21, however, includes the first imaging unit 11 composed of the fish-eye lens 3 having a large imaging field of view β for imaging an upper half of a scene. The camera system 21, therefore, is able to acquire an image of a scene with a wide angle by a combination of the first image unit 11 and the second image unit 12.

According to the camera system 21 in this embodiment, like the camera system 1 in the previous embodiment, an image of a scene with a wide angle can be acquired by synthesizing an image of an upper half of the scene acquired by the first imaging unit 11 and an image of a lower half of the scene acquired by the eight cameras 4 (4A, 4B) of the second imaging unit 12.

In the second imaging unit 12, since the eight cameras 4 allot eight imaging regions along eight imaging directions, each of the eight cameras 4 is able to acquire an image with a high resolution. As a result, a lower half of a scene, spread with a wide angle, can be imaged with a high resolution by the second imaging unit 12.

By supplying synchronization signals to the first and second imaging units 11 and 12, it is possible to acquire partial images of a dynamic object with a wide angle by the first and second imaging units 11 and 12 and then synthesize the thus acquired images along elapsed time.

Since both the imaging centers of the first and second imaging units 11 and 12, which lie on the center axis of the reflecting mirror 22, can be made closer to each other, it is possible to significantly reduce a parallax between the images acquired by the first and second imaging units 11 and 12. As a result, it is possible to easily synthesize images acquired by respective cameras.

In each of the embodiments, the first imaging unit 11 is composed of the fish-eye lens 3. However, it may be configured as another optical element without departing from the scope of the present invention. For example, the first imaging unit 11 may be configured as a number of small-sized cameras arranged radially in such a manner as to acquire an image of an upper half of a scene over the reflecting mirror.

Also, in each of the embodiments, the center axis of each of the reflecting mirrors 2 and 22 is set to extend along the vertical direction. However, the present invention is not limited thereto. The center axis of each of the reflecting mirrors 2 and 22 may be set to extend along the horizontal direction or along any other direction depending on the application use of the camera system. Even in this case, the camera system may be configured such that an image of an upper half of a scene on the opening portion side of the reflecting mirror is acquired by the first imaging unit and an image of a lower half of the scene, formed on the reflecting mirror, is acquired by the second imaging unit.

Further, in each of the embodiments, the fish-eye (wide-range lens) is disposed outwardly from the opening surface of each of the reflecting mirrors 2 and 22. However, the lens or the like of the first imaging unit may be disposed inwardly from the opening surface of the reflecting mirror. In particular, in the case where the imaging range of the second imaging unit 12 is large as shown in FIG. 2, even if the first imaging unit 11 is disposed inwardly from the opening surface of the reflecting mirror, the camera system can cover a wide imaging range as a whole.

In any case, the first imaging unit is provided within a plane composed of the outer surface of the reflecting mirror and a plane extending from the outer surface of the reflecting mirror on the opening portion side.

Another camera system according the present invention includes a first imaging unit having at its leading end a fish-eye lens, and a second imaging unit having at its leading end a fish-eye lens. The first imaging unit and the second imaging unit are arranged adjacent to each other in such a manner that optical axes of the fish-eye lenses of the first and second imaging units are offset from each other in parallel, and imaging directions of the fish-eye lenses of the first and second imaging units are reversed to each other.

Preferably, the camera system further includes a signal synthesizing portion for synthesizing image signals acquired by the first and second imaging units, wherein the signal synthesizing portion is connected to the first and second imaging units.

Hereinafter, a further embodiment of the above-described camera system according to the present invention will be further described with reference to FIGS. 7 to 10.

Figure 7:
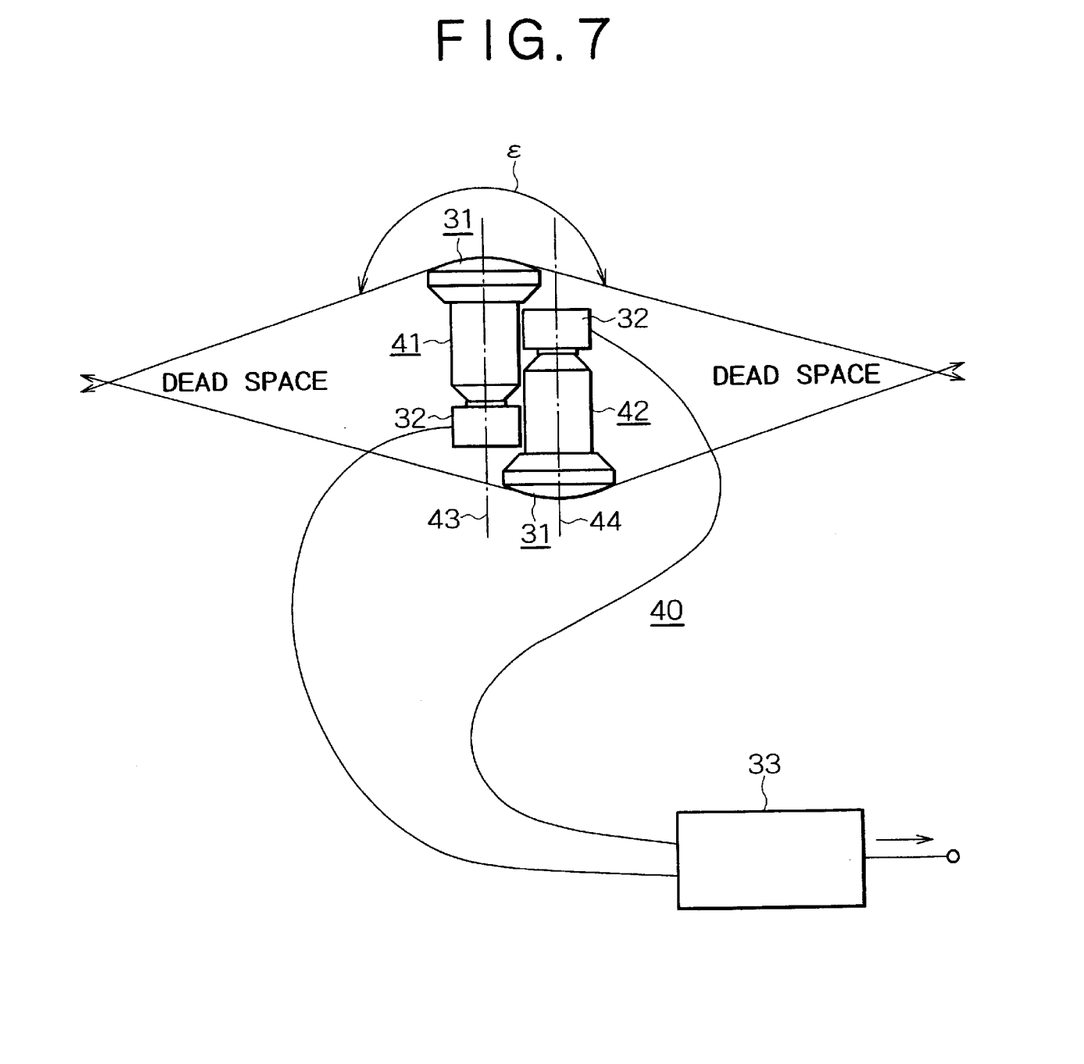
FIG. 7 is a schematic view showing a configuration of a further embodiment of the camera system of the present invention.

FIG. 7 is a schematic view showing a configuration of the camera system according to this embodiment.

Referring to FIG. 7, there is shown a camera system 40 including a first imaging unit (camera unit) 41 having at its leading end a fish-eye lens 31 and a second imaging unit (camera unit) 42 having at its leading end a fish-eye lens 31. It is to be noted that each fish-eye lens 31 has an imaging field of view ϵ.

Images acquired by the first and second imaging units 41 and 42 via the fish-eye lenses 31 are converted into image signals in camera portions 32 respectively provided in the imaging units 41 and 42, being supplied to a signal synthesizing unit 33 at a stage subsequent to the camera system 40, and are synthesized by the signal synthesizing unit 33. The signal synthesizing unit 33 is provided inside or outside the camera system 40.

An imaging device such as a CCD solid-state imaging device is provided in each of the camera portions 32 for converting the acquired image into an image signal.

According to this embodiment, like the related art camera system 50 shown in FIG. 1, the fish-eye lens 31 of the first imaging unit 41 and the fish-eye lens 31 of the second imaging unit 42 are arranged such that imaging directions thereof are reversed to each other.

According to this embodiment, however, unlike the related art camera system, optical axes of the fish-eye lenses 31 of the first and second imaging units 41 and 42 are offset from each other in parallel. To be more specific, the optical axis 43 of the fish-eye lens 31 of the first imaging unit 41 is offset from the optical axis 44 of the fish-eye lens 31 of the second imaging unit 42 in parallel.

With this configuration, the distance between the two fish-eye lenses 31 becomes shorter than that in the case of the camera system shown FIG. 1, with a result that a dead space becomes narrower than that in the case of the camera system shown in FIG. 1.

Figure 8:
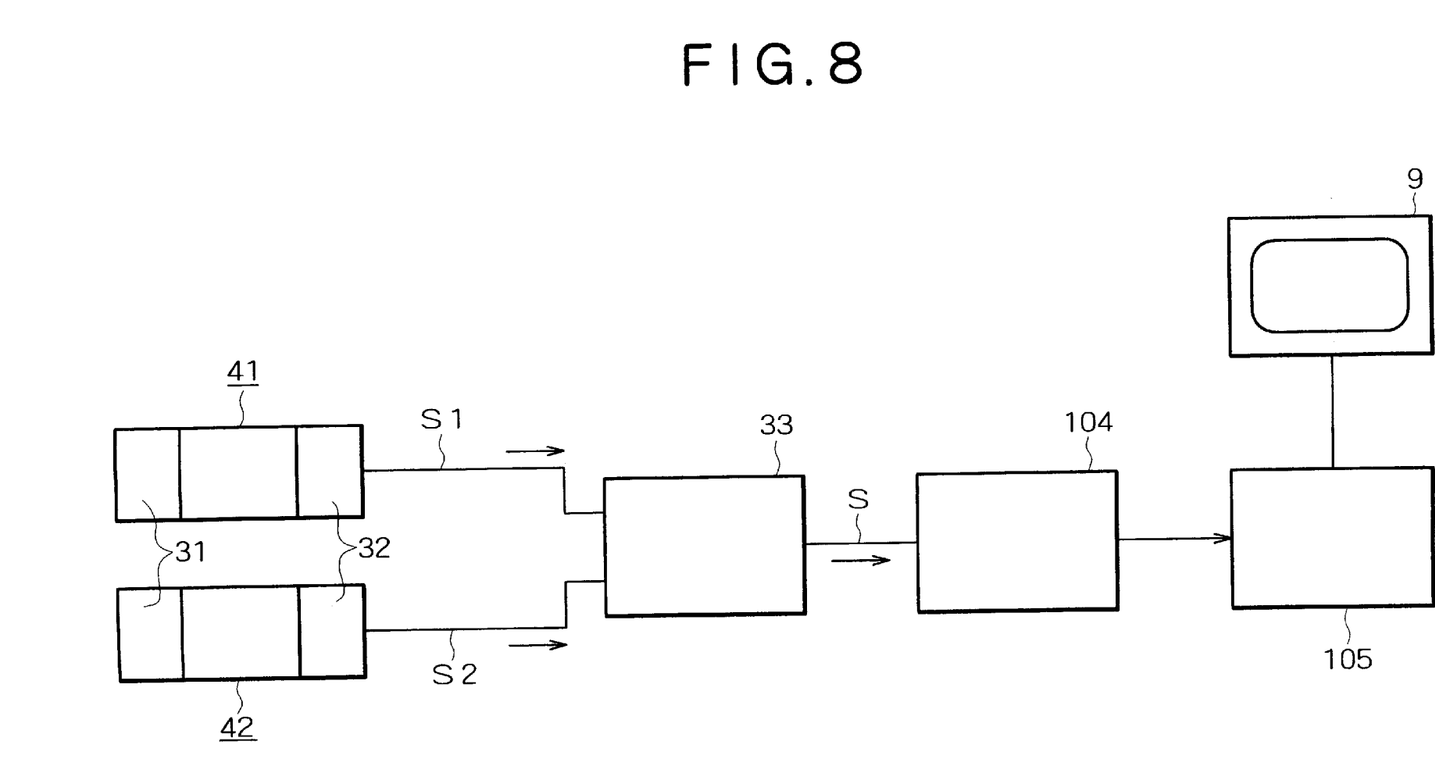
FIG. 8 is a block diagram showing one example of a configuration for synthesizing image signals acquired by the camera system shown in FIG. 7.

FIG. 8 is a block diagram showing one example of a configuration for synthesizing image signals in the camera system 40 shown in FIG. 7.

While not shown, an imaging device such as a CCD solid state imaging device is provided in each of the camera portions 32 of the first and second imaging units 41 and 42 each having the fish-eye lens 31.

Synchronization signals may be supplied to the imaging devices. With this configuration, by adjusting triggers of the synchronization signals, images acquired at the same time can be synthesized by the signal synthesizing unit 33. As a result, even for a dynamic object, images of the dynamic object acquired at the same time by respective cameras can be synthesized into a composite image.

Image signals acquired by the imaging devices are supplied to the signal synthesizing unit 33.

An image signal S1 acquired by the first imaging unit 41 via the fish-eye lens 31 and an image signal S2 acquired by the second imaging unit 42 via the fish-eye lens 31 are synthesized into a signal S by the signal synthesizing unit 33.

A signal recording/storing portion 104 for recording or storing the described synthesized signal is provided at a stage subsequent to the signal synthesizing unit 33. A signal displaying portion 105 for displaying signals, which have been recorded or stored in the signal recording/storing portion 104, on a monitor 9 is provided at a stage subsequent to the signal recording/storing portion 104.

With this configuration, image signals acquired by the imaging units 41 and 42 can be synthesized into a composite image signal by the signal synthesizing unit 33, and the composite image signal can be recorded or stored in the signal recording/storing portion 104. Further, the image signal, which has been recorded or stored in the signal recording/storing portion 104, can be displayed on an image display such as a TV receiver or the monitor 9 by the signal displaying portion 105, as needed.

In place of displaying images on an image display such as a TV receiver or the monitor 9, image data may be transmitted to a reception side via wire communication such as telephone line or optical fiber communication, or wave communication such as broadcasting wave or portable telephone communication, and the images can be recorded in recording media or displayed on image displays.

The synthesis of images performed in the configuration shown in FIGS. 7 and 8 will be described in detail with reference to FIGS. 9 and 10.

Figure 9:
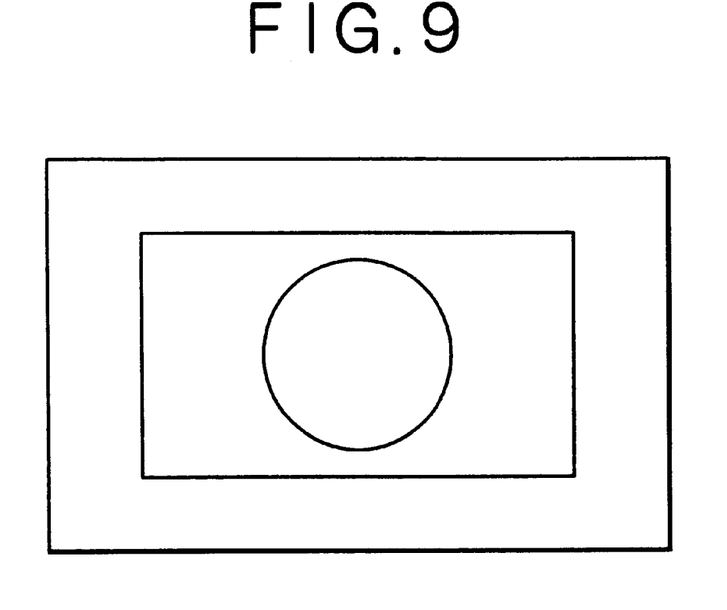
FIGS. 9 and 10 are diagrams illustrating synthesis of images in the configuration shown in FIGS. 7 and 8.
Figure 10:
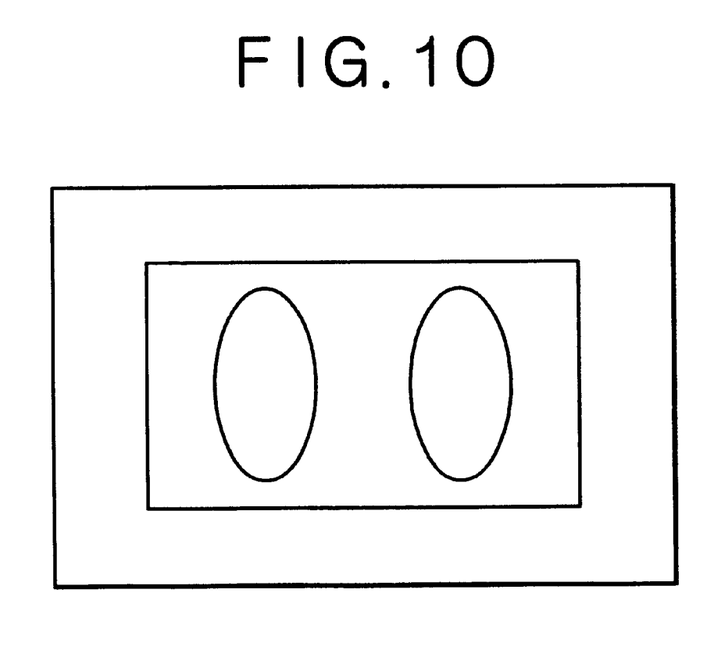

FIG. 9 shows one example of the form (circular shape) of an image equivalent to each of the image signals S1 and S2 obtained by the first and second imaging units 41 and 42 shown in FIG. 8, and FIG. 10 shows one example of the form of an image equivalent to the signal S synthesized by the signal synthesizing unit 33 shown in FIG. 8.

An aspect ratio of each of the image signals S1 and S2 shown in FIG. 9 is changed. For example, each of the image signals S1 and S2 is compressed into ½ only in the horizontal direction. As a result, each of the image signals S1 and S2 in the form of the circular shape shown in FIG. 9 is converted into an image signal in the form of an elliptic shape (the size in the vertical direction is twice the side in the horizontal direction).

The converted image signals S1 and S2 are then synthesized into one video signal S by the signal synthesizing unit 33. As shown in FIG. 10, in the video signal S, the two elliptic image signals converted from the image signals S1 and S2 obtained by the two imaging units 41 and 42 are located in parallel.

The video signal S obtained by synthesizing the converted image signals S1 and S2 is supplied to the recording/storing portion 104, to be recorded or stored in recording media.

In the case of compressing an image only in the horizontal direction as shown in FIGS. 9 and 10, the compression ratio is determined as follows:

For a signal for a standard TV receiver such as NTSC, each of images may be compressed to about ½ only in the horizontal direction and the compressed images may be synthesized. For a signal for high-definition TV such as HDVS, each of images may be compressed into about 16/18 and the compressed images may be synthesized.

The video signal S, which has been obtained by compressing two images and synthesizing the compressed images, can be matched to an HDVS format or to recording in a video camera.

In other words, the camera system according to this embodiment is able to acquire images, compress the images, and synthesize the compressed images into a composite signal in the form being simply recordable in a video camera or the like.

It is to be noted that the configuration for synthesizing image signals acquired by the imaging units 41 and 42 is not limited to that shown in FIG. 8, but may be any other configuration without departing from the scope of the present invention.

For example, an image signal storing portion may be provided between each of the imaging units 41 and 42 and the signal synthesizing unit 33 for storing signals based on images acquired by the imaging units 41 and 42. With this configuration, the image signals stored in the signal storing portions can be read out and synthesized by the signal synthesizing unit 33 along elapsed time by making use of synchronization signals.

According to this embodiment, since the optical axes 43 and 44 of the fish-eye lenses 31 of the first and second imaging units 41 and 42 are offset from each other in parallel, the distance between both the fish-eye lenses 31 can be shortened. As a result, it is possible to reduce a dead space and a parallax.

The reduction in dead space is effective to acquire an image of a scene with a wider angle as compared with the related art camera system, and the reduction in parallax is effective to synthesize image signals by a relatively simple method; for example, by changing the above-described aspect ratio.

The camera system in this embodiment can be achieved only by changing the arrangement of the imaging units 41 and 42 from the related art arrangement. In other words, the camera system in this embodiment is able to acquire an image of a scene with a wide angle with a relatively simple structure.

As described above, a first camera system according to the present invention has the following effects:

An image of a scene with a wide angle can be obtained by synthesizing an image of an upper half of the scene acquired by the first imaging unit and an image of a lower half of the scene acquired by the second imaging unit.

Since divided parts of a scene are imaged, in the second imaging unit, by a number of the cameras, each of the cameras is able to acquire the partial image with a high resolution. As a result, the camera system is able to acquire the image of the scene as a whole with a high resolution.

By supplying synchronization signals to the first and second imaging units, it is possible to acquire images of a dynamic object with a wide angle and to synthesize the images along elapsed time.

Since both the imaging centers of the first and second imaging units, which lie on the center axis of the reflecting mirror, can be made closer to each other, a parallax between the images acquired by the first and second imaging units can be significantly reduced. As a result, since the images acquired by the first and second imaging units can be synthesized easily, it is possible to obtain an image signal of a scene with a wide angle, such as a hemispherical or omni-directional scene.

A second camera system according to the present invention has the following effects:

The distance between the fish-eye lenses of the first and second imaging units can be shortened by a relatively simple configuration. Accordingly, it is possible to reduce a dead space and a parallax. As a result, it is possible to acquire an image of a scene with a wider range as compared with the related art camera system, and to synthesize image signals acquired by the first and second imaging units with a relatively simple manner.

In the case of adopting the configuration that the signal synthesizing portion for synthesizing image signals acquired by the first and second imaging units is connected to the first and second imaging units, since the image signals acquired by the first and second imaging units can be synthesized easily into one composite signal at the signal synthesizing portion, the camera system easily is able to obtain an image signal of a scene in the form being simply recordable in a video camera or the like.

Although the present invention has been described with reference to specific embodiments, those of skill in the art will recognize that changes may be made thereto without departing from the spirit and scope of the present invention as set forth in the hereafter appended claims.

What is claimed is:

1. A camera system, comprising:
   a reflecting mirror having a hyperbolic or parabolic mirror surface disposed around a center axis, the mirror surface being spread on one side of the center axis to form an opening portion;
   a first imaging unit provided within a plane composed of an outer surface of the reflecting mirror and a plane extending from the outer surface of the reflecting mirror on a side of the opening portion; and
   a second imaging unit disposed opposite to the mirror surface of the reflecting mirror, the second imaging unit including a plurality of cameras disposed on a same circumference centered at the center axis of the reflecting mirror so as to be spaced from each other at equal intervals.

2. A camera system as claimed in claim 1, wherein the first imaging unit has one fish-eye lens, an imaging center of which lies on the center axis of the reflecting mirror.

3. A camera system as claimed in claim 1, wherein the second imaging unit is formed by alternatively arranging cameras of a near focal point type and cameras of a far focal point type.

4. A camera system as claimed in claim 1, further comprising a signal synthesizer for synthesizing image signals acquired by the first imaging unit and the second imaging unit.

* * * * *